(12) United States Patent
Chen

(10) Patent No.: US 9,994,776 B2
(45) Date of Patent: Jun. 12, 2018

(54) REFINING APPARATUS AND REFINING METHOD FOR RECYCLING WASTE PLASTICS

(71) Applicant: GL Renewable Energy Company, New Taipei (TW)

(72) Inventor: Chao-Kao Chen, Minxiong Township (TW)

(73) Assignee: GL Renewable Energy Company, Ltd., New Taipei (TW)

( * ) Notice: Subject to any disclaimer, the term of this patent is extended or adjusted under 35 U.S.C. 154(b) by 21 days.

(21) Appl. No.: 15/384,996

(22) Filed: Dec. 20, 2016

(65) Prior Publication Data

US 2017/0101585 A1    Apr. 13, 2017

Related U.S. Application Data

(62) Division of application No. 14/325,481, filed on Jul. 8, 2014, now Pat. No. 9,556,385.

(30) Foreign Application Priority Data

Mar. 13, 2014 (TW) .............................. 103108975 A

(51) Int. Cl.
| | |
|---|---|
| *C08J 11/00* | (2006.01) |
| *C08J 11/04* | (2006.01) |
| *C08J 11/10* | (2006.01) |
| *C08J 11/12* | (2006.01) |
| *C10J 1/00* | (2006.01) |
| *C10J 1/10* | (2006.01) |
| *C10G 1/10* | (2006.01) |

(52) U.S. Cl.
CPC ................. *C10G 1/10* (2013.01); *C08J 11/12* (2013.01); *C08J 2323/06* (2013.01); *C08J 2323/12* (2013.01); *C08J 2325/06* (2013.01); *C10G 2300/1003* (2013.01)

(58) Field of Classification Search
CPC ........................ C10G 1/00; C10G 1/10; C10G 2300/00–2300/1003; C08J 11/00; C08J 11/04; C08J 11/10; C08J 11/12; C08J 2323/00–2323/06; C08J 2323/10; C08J 2323/12; C08J 2325/00–2325/04; C08J 2325/06

See application file for complete search history.

(56) References Cited

U.S. PATENT DOCUMENTS

| | | | | |
|---|---|---|---|---|
| 4,110,266 A * | 8/1978 | Sheratte | ................. | C08G 65/26 521/167 |
| 7,932,424 B2 * | 4/2011 | Fujimoto | ............... | B01J 8/0055 201/2.5 |

* cited by examiner

*Primary Examiner* — Natasha E Young
(74) *Attorney, Agent, or Firm* — Wang Law Firm, Inc.

(57) ABSTRACT

A refining apparatus and a refining method for recycling waste plastics. The refining apparatus includes a feeding device, a pyrolysis furnace, a chloride-decomposing device, a first condensation device, a temporary storage, a still, a sieve plate tower, a second condensation device, and a receiving tank. The waste plastics are cracked by the pyrolysis furnace to produce plastic gas by heating. The chlorides of the plastic gas are removed by the chloride-decomposing device having the ammonia to produce a first oil gas. The first oil gas is condensed by the first condensation device to produce raw oil. The raw oil is heated by the still to produce a second oil gas. The second oil gas is sieved by the sieve plate tower to produce a third oil gas. The third oil gas is condensed by the second condensation device to produce finished oil received by the receiving tank.

5 Claims, 5 Drawing Sheets

REFINING APPARATUS AND REFINING METHOD FOR RECYCLING WASTE PLASTICS

CROSS-REFERENCE TO RELATED APPLICATION

This application is a divisional of U.S. patent application Ser. No. 14/325,481, now U.S. Pat. No. 9,556,385, filed on Jul. 8, 2014, which claims the benefit of Taiwan Intellectual Property Office Application No. 103108975, filed on Mar. 13, 2014, in the Taiwanese Intellectual Property Office, the disclosures of which are incorporated herein their entirety by reference.

BACKGROUND OF THE INVENTION

1. Field of the Invention

The present invention relates to an apparatus and method for recycling waste plastics, in particular with respect to a refining apparatus and a refining method for recycling waste plastics.

2. Description of the Related Art

With the development of technology and progress of civilization, people reply more and more on products of petrochemical industry, such as plastic product and gasoline and so on. However, as the amount of the petroleum crude oil used in the petrochemical industry has been declining as people's excessive dependence; recently, countries over the world have been developing the economy while engaging in how to reduce the usage of the petroleum crude oil.

In addition, people also have to process the waste plastics generated by the used plastic products, and if the waste plastics are buried, the plastic, which is difficult to decompose is not easy to decay, and it also destroys the soil environment. Consequently, the waste landfill will inevitably cause severe environmental problem. With the gradual increase of environmental protection consciousness, countries over the world will dedicate to the development of environmental industry and substantially commercialize the application to the environmental process. However, the problem is that the current technology still cannot refine the recycling waste plastics as the renewable oil of high purity by using the limited resource effectively.

SUMMARY OF THE INVENTION

In view of the aforementioned defects, the purpose of the present invention is to provide a refining apparatus and a refining method for recycling waste plastics to refine the waste plastics as the renewable oil having high purity by using the limited resource effectively.

In order to achieve the preceding purpose, the present invention may provide a refining apparatus for recycling waste plastics at least comprising: a feeding device providing waste plastics; a pyrolysis furnace having a rotary kiln and a burner, the rotary kiln connected with the feeding device for receiving the waste plastics and being rotating, the burner being assembled under the rotary kiln and burning a fuel for providing heat to the waste plastics in the rotary kiln, so as to crack the waste plastics to produce a plastic gas; a chloride-decomposing device having ammonia and being assembled above the rotary kiln, wherein chlorine of the plastic gas are removed and a first oil gas and a mixed gas are produced by reacting the plastic gas with the ammonia in the chloride-decomposing device; a first condensation device connecting with the chloride-decomposing device for enabling the first oil gas and the mixed gas floating into the first condensation device, wherein the first condensation device condenses the first oil gas to produce a raw oil; a temporary storage being assembled under the first condensation device and receiving the raw oil; a still receiving the raw oil from the temporary storage and heating the raw oil to produce a second oil gas; a sieve plate tower connected above the still for enabling the second oil gas floating upwardly in the sieve plate tower, and having a plurality of sieve plates arranged in a vertical direction orderly sieving the second oil gas, respectively; wherein a heavier oil gas of the second oil gas is transformed into an oil via the sieve plates and sent back to the still, and a lighter oil gas of the second oil gas floats through the sieve plates to produce a third oil gas; a second condensation device connecting with the sieve plate tower and condensing the third oil gas to produce a finished oil; and a receiving tank being assembled under the second condensation device and receiving the finished oil.

Wherein, the refining apparatus for recycling waste plastics of the present invention may further comprise: a tundish assembled between the feeding device and the pyrolysis furnace; a bunker elevator connecting the feeding device and the tundish, and carrying the waste plastics from the feeding device to the tundish; and a screw extruder connecting the tundish and the rotary kiln, and extruding the waste plastics from the tundish to the rotary kiln.

Wherein, the refining apparatus for recycling waste plastics of the present invention may further comprise a pipe connecting the first condensation device and the burner, the mixed gas floating from the first condensation device to the burner via the pipe for serving as the fuel, thereby the intermediate product of the refining process, such as the mixed gas, can be used effectively.

Wherein, the refining apparatus for recycling waste plastics of the present invention may further comprise a vacuum device connected between the first condensation device and the temporary storage and being adjacent to the temporary storage, wherein the vacuum device has a filtering tank and a vacuum tank connecting with each other, wherein the vacuum tank accelerates the raw oil flowing to the temporary storage and the filtering tank blocks the raw oil and an impurity from flowing into the vacuum tank.

Wherein, the refining apparatus for recycling waste plastics of the present invention may further comprise a preheating device being assembled between the sieve plate tower and the second condensation device, wherein the preheating device has two pipes designed to exchange heat, wherein one pipe of the two pipes connects with the sieve plate tower to carry the third oil gas and cool down the third oil gas via heat exchange, and the other pipe connects with the temporary storage and the still to carry the raw oil from the temporary storage to the still and thereby to warm up the raw oil via the heat exchange.

In addition, the present invention may further provide a refining method for recycling waste plastics, at least comprising following steps: providing waste plastics in a feeding device; carrying the waste plastics to a rotary kiln of a pyrolysis furnace, wherein the rotary kiln rotates the waste plastics; providing heat to the waste plastics in the rotary kiln by burning a fuel via a burner, so that the waste plastics being cracked to produce a plastic gas, wherein the burner is assembled under the rotary kiln; introducing the plastic gas into a chloride-decomposing device having ammonia to remove chlorine of the plastic gas and produce a first oil gas and a mixed gas by reacting the waste plastics with the ammonia; condensing the first oil gas to produce a raw oil by a first condensation device; receiving the raw oil by a temporary storage; receiving the raw oil from the temporary storage by a still, wherein the still warms up the raw oil to produce a second oil gas; introducing the second oil gas into a sieve plate tower, wherein the sieve plate tower has a plurality of sieve plates arranged in a vertical direction orderly to sieve the second oil gas, respectively, wherein a heavier oil gas of the second oil gas is transformed into an oil via the sieve plates and sent back to the still, and a lighter oil gas of the second oil gas floats through the sieve plates to produce a third oil gas; condensing the third oil gas to produce a finished oil by a second condensation device; and receiving the finished oil by a receiving tank.

Wherein, the step of carrying the waste plastics to a rotary kiln of a pyrolysis furnace may comprise the following steps: carrying the waste plastics from the feeding device to a tundish by a bunker elevator; and extruding the waste plastics from the tundish to the rotary kiln by a screw extruder.

Wherein, the mixed gas may be carried to the burner for serving as the fuel by a pipe when the mixed gas is produced.

Wherein, the refining method for recycling waste plastics of the present invention may further comprise the following step: using a filtering tank and a vacuum tank to accelerate the raw oil flowing to the temporary storage.

Wherein, the refining method for recycling waste plastics of the present invention may further comprise the following step: exchanging heat between the third oil gas and the raw oil by a preheating device to cool down the third oil gas and warm up the raw oil gas carried from the temporary storage to the still when the third oil gas is produced.

As a result, according to a refining apparatus and a refining method for recycling waste plastics of the present invention, there are one or more advantages as follows:

(1) The burner uniformly provides heat to the waste plastics in the rotary kiln by rotating the rotary kiln.

(2) The sieve plate tower respectively sieves the second oil gas, so that the lighter oil gas floats through the sieve plates to produce a third oil gas, so as to refine the recycling waste plastics as the renewable oil having higher purity by using the limited resource effectively.

(3) A screw extruder orderly extrudes the waste plastics from the tundish to the rotary kiln so as to control the amount of the waste plastics in the rotary kiln.

(4) A preheating device transfers the heat of the third oil gas to the raw oil so as to reduce the amount of fuel.

DETAILED DESCRIPTION OF THE PREFERRED EMBODIMENTS

Figure 1:
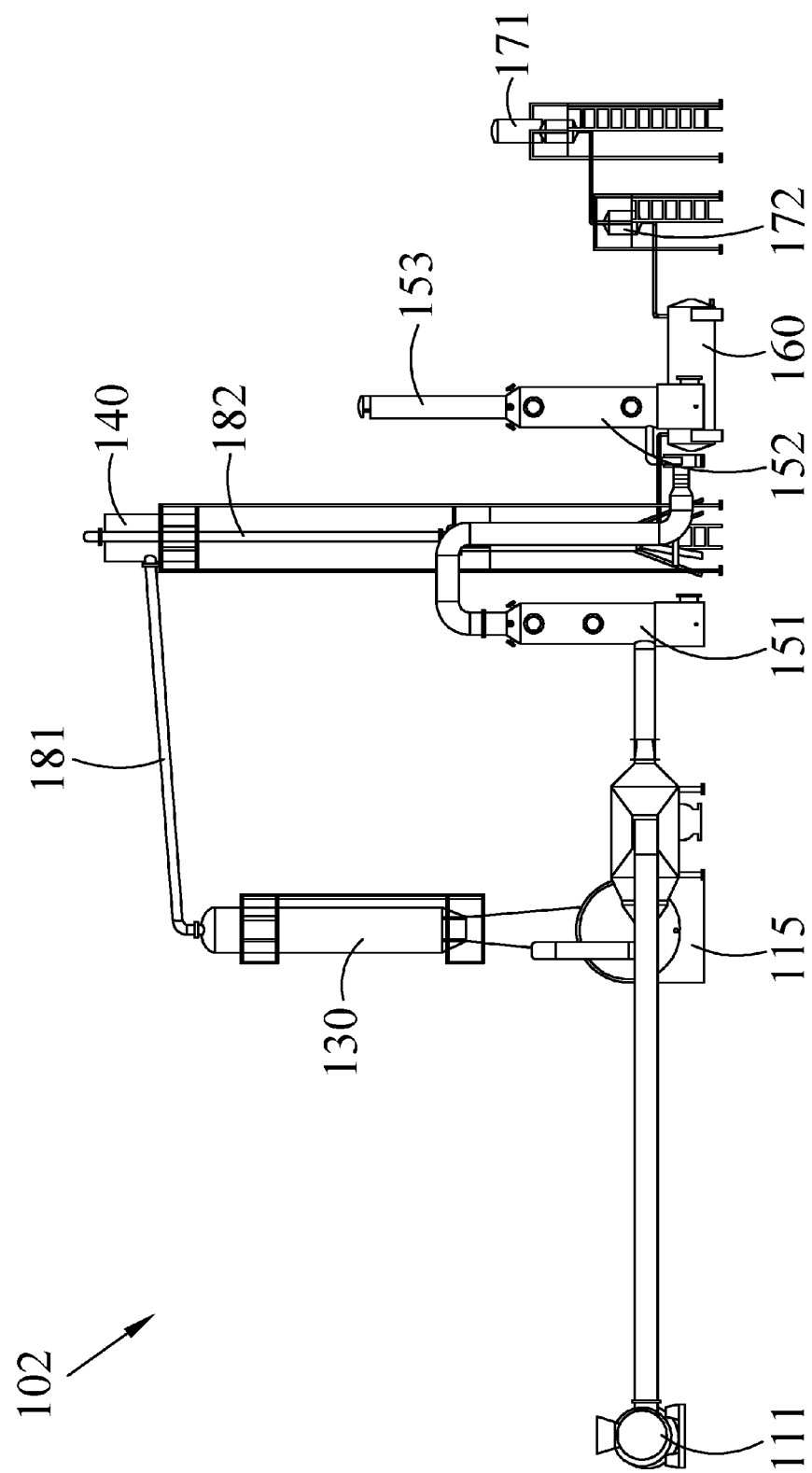
FIG. 1 is a schematic diagram of the first embodiment of a raw oil obtaining device of a refining apparatus for recycling waste plastics according to the present invention.
Figure 3:
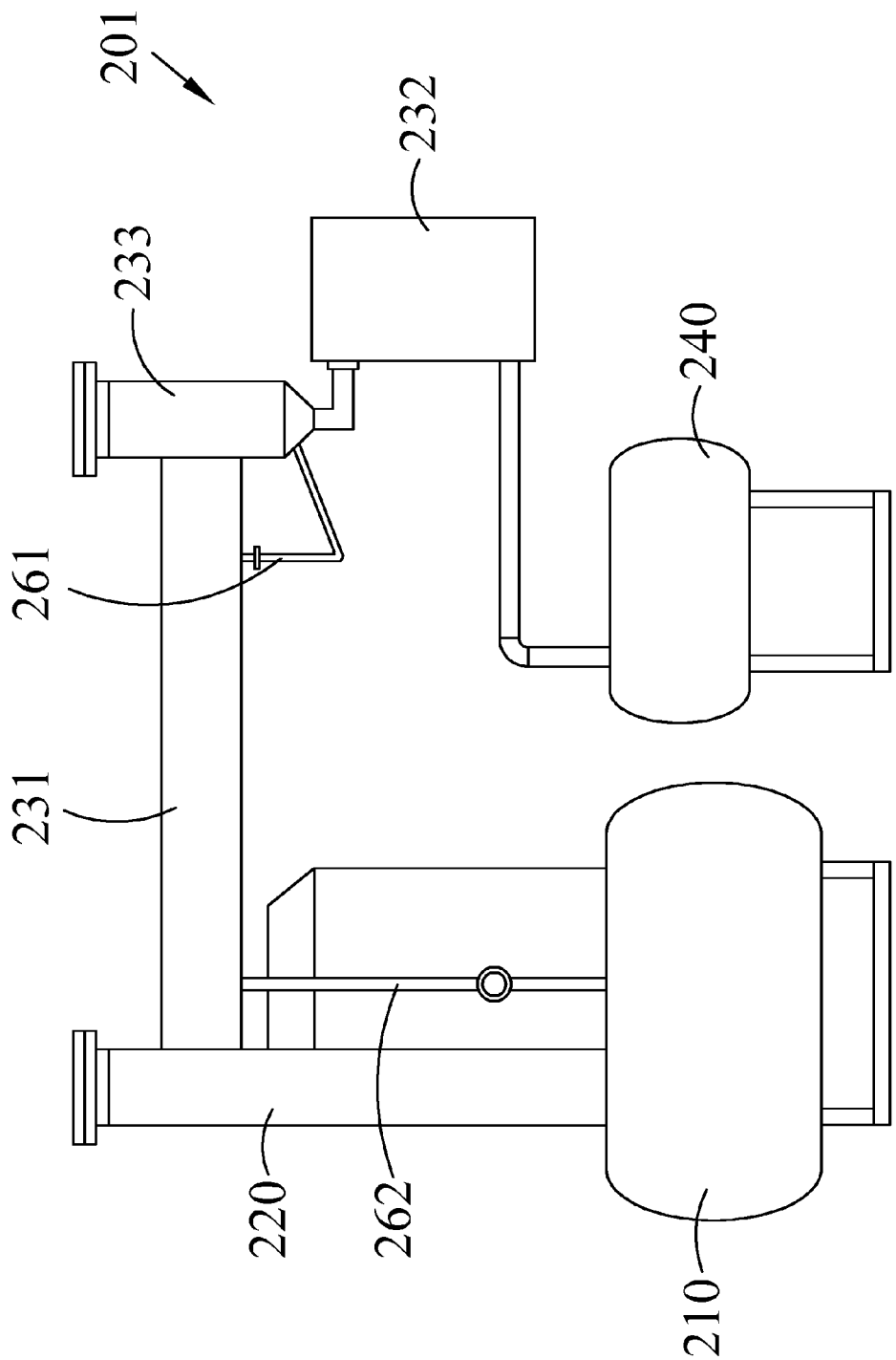
FIG. 3 is a schematic diagram of the first embodiment of a rear end device of a refining apparatus for recycling waste plastics according to the present invention.

Please with reference to FIG. 1 and FIG. 3, FIG. 1 is a schematic diagram of the first embodiment of a raw oil obtaining device of a refining apparatus for recycling waste plastics according to the present invention, and FIG. 3 is a schematic diagram of the first embodiment of a rear end device of a refining apparatus for recycling waste plastics according to the present invention. As FIG. 1 and FIG. 3 show, a refining apparatus for recycling waste plastics of the present invention comprises a raw oil obtaining device 102 refining the waste plastics as raw oil and a rear end device 201 further refining the raw oil as finished oil. Wherein, the raw oil obtaining device 102 at least comprises a feeding device 111, a pyrolysis furnace 115, a chloride-decomposing device 130, a first condensation device 140 and a temporary storage 160; and the rear end device 201 at least comprises a still 210, a sieve plate tower 220, a second condensation device 232 and a receiving tank 240.

Figure 2:
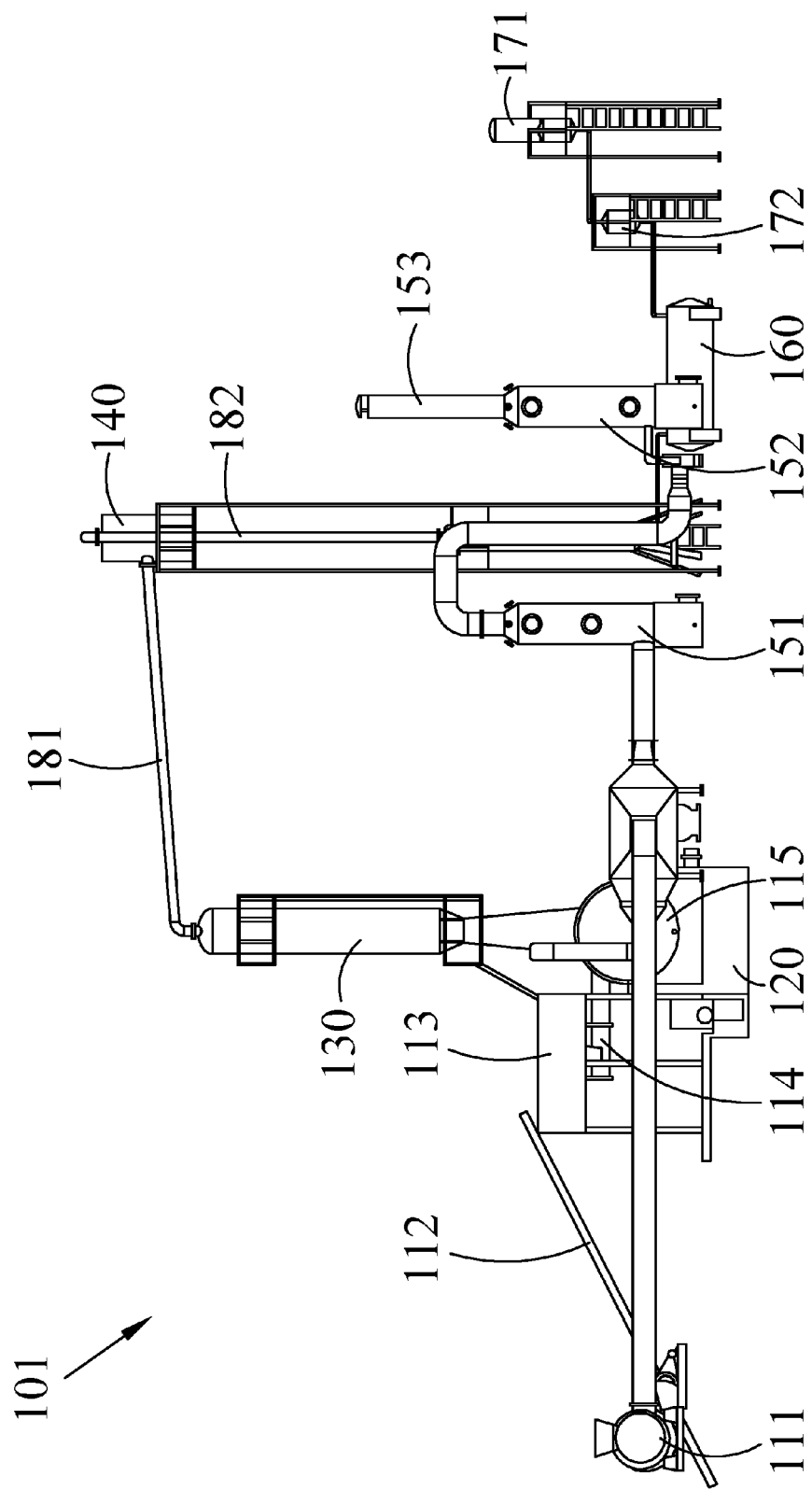
FIG. 2 is a schematic diagram of the second embodiment of a raw oil obtaining device of a refining apparatus for recycling waste plastics according to the present invention.

Wherein, the feeding device 111 is used to provide waste plastics. For example, the feeding device 111 can be a concave tank comprising an accommodating space, so a user can place the waste plastics in the accommodating space of the concave tank, wherein the waste plastics can be Polypropylene (PP) plastic, Polyethylene (PE) plastic or Polystyrene (PS) plastic. When the feeding device 111 is fed with the waste plastics, the pyrolysis furnace 115 connected with the feeding device 111 receives the waste plastics from the feeding device 111. Besides, the rotary kiln of the pyrolysis furnace 115 is rotated to rotate the waste plastics, which are received. Please with reference to FIG. 2, it is a schematic diagram of the second embodiment of a raw oil obtaining device of a refining apparatus for recycling waste plastics according to the present invention. As shown in FIG. 1 to FIG. 3, the differences between the raw oil obtaining device 101 of the second embodiment and the raw oil obtaining device 102 of the first embodiment are that the raw oil obtaining device 101 of the second embodiment further has a bunker elevator 112, a tundish 113 and a screw extruder 114 between the feeding device 111 and the pyrolysis furnace 115 so as to carry the waste plastics from the feeding device 111 to the pyrolysis furnace 115, and the pyrolysis furnace 115 further comprises a burner 120.

Moreover, the tundish 113 of the raw oil obtaining device 101 is disposed between the feeding device 111 and the pyrolysis furnace 115, the bunker elevator 112 connects the feeding device 111 and the tundish 113, and the bunker elevator 112 can be a conveyor belt with an inclined angle, so that the bunker elevator 112 can convey the waste plastics from the feeding device 111 to the tundish 113. The screw extruder 114 connects the tundish 113 and the rotary kiln of the pyrolysis furnace 115. For example, the screw extruder 114 is assembled under the tundish 113 to receive the waste plastics and extrudes the waste plastics received from the tundish 113 to the rotary kiln. When the pyrolysis furnace 115 receives the waste plastics, the rotary kiln conducts rotating to rotate the waste plastics. Besides, the pyrolysis furnace 115 further has the burner 120 which is assembled under the rotary kiln. Wherein, the burner 120 burns a fuel for providing heat to the waste plastics in the rotary kiln, so as to crack the waste plastics to produce a plastic gas. Wherein, the fuel, which the burner 120 uses, can be any flammable objects or gases.

Besides, the pyrolysis furnace 115 can be a metal material cylinder which can electromagnetically heat the waste plastics in the pyrolysis furnace 115 and irradiate with microwave to the heated waste plastics so as to crack the waste plastics to produce the plastic gas through a shorter duration and limited energy resource. For example, the pyrolysis furnace 115 can have a frequency conversion electromagnetic heater (not shown) which transforms electrical energy into heat energy via electromagnetic induction. For instance, the alternating current of 220 V or 380 V and 60 Hz is transformed into a high frequency voltage of 20-40 KHz, and the current of the high frequency voltage flows through a coil to produce an alternating magnetic field of high-speed transformation, so that the conductive metal material produces a number of vortexes in the metal for enabling the metal material cylinder promptly heating itself and thereby warming up the waste plastics. Then, microwave is irradiated to the waste plastics, which are warmed up by the electromagnetic heater. The microwave energy can be absorbed by the waste plastics according to the interaction of the waste plastics and the microwave to reduce the activating energy among the particles of the waste plastics. So, the micro-densification speed of the waste plastics can be accelerated to quicken the sinter of the waste plastics for producing the plastic gas.

The chloride-decomposing device 130 having ammonia is assembled above the rotary kiln of the pyrolysis furnace 115. For example, the chloride-decomposing device 130 can be an ammonia cylinder assembled above the rotary kiln, when the pyrolysis furnace 115 produces the plastic gas, the plastic gas will be reacted with the ammonia in the chloride-decomposing device 130 to remove the chlorides, which is contained in the plastic gas, and produce the first oil gas and the mixed gas without chlorides. Wherein, the mixed gas can be hydrogen, nitrogen and non-condensing gas and the non-condensing gas can be methane, ethane, propane or butane. Furthermore, a gas channel is further assembled between the chloride-decomposing device 130 and the pyrolysis furnace 115, such that the plastic gas floats into the chloride-decomposing device 130 along the gas channel.

A first condensation device 140 is connected with the chloride-decomposing device 130 via pipe 181 for enabling the first oil gas, which is produced by the chloride-decomposing device 130, floating into the first condensation device 140 along the pipe 181. Wherein, the first oil gas is condensed by the first condensation device 140 to produce raw oil. For example, the first condensation device 140 can be a shell and tube condenser having water tubes, when the first oil gas and the mixed gas floats into the first condensation device 140 and contact to the water tubes, the first oil gas is condensed as fluid to produce the raw oil because the first oil gas has the higher condensation point (boiling point). Besides, because the condensation point (boiling point) of the mixed gas is lower, the mixed gas will not be condensed as fluid even contacts to the water tubes. Moreover, the temporary storage 160 is assembled under the first condensation device 140, so that the raw oil produced by the first condensation device 140 flows into the temporary storage 160 along a channel (not shown), i.e. the temporary storage 160 is used to receive the raw oil. Wherein, the temporary storage 160 can be lying type.

In addition, the raw oil obtaining device 101 and/or 102 of the refining apparatus for recycling waste plastics of the present invention can further comprises a vacuum device. The vacuum device is connected between the first condensation device 140 and the temporary storage 160 and is adjacent to the temporary storage 160 so as to accelerate the raw oil flowing to the temporary storage 160. For example, the vacuum device has a vacuum tank 171 and a filtering tank 172, wherein the filtering tank 172 is connected with the vacuum tank 171 and is adjacent to the channel of the temporary storage 160, and the vacuum tank 171 is used to create a vacuum state for the channel to accelerate the raw oil flowing to the temporary storage 160. Moreover, the filtering tank 172 blocks the raw oil and an impurity from flowing into the vacuum tank 171 as the high-speed flow velocity.

In addition, the raw oil obtaining device 101 and/or 102 of the refining apparatus for recycling waste plastics of the present invention can further comprises the pipe 182 connecting to the first condensation device 140 and the burner 120, so that the mixed gas, which is remained in gaseous state after being processed by the first condensation device 140, can float from the first condensation device 140 into the burner 120 through the pipe 182 for serving as fuel of the burner 120. For example, the pipe 182 is connected with the upper end of the first condensation device 140 and because the gaseous mixed gas is characterized of floating upwardly, the mixed gas can enter the pipe 182 and float into the burner 120 along the pipe 182. Consequently, other than burning additional flammable objects or gases, the burner 120 also burns the mixed gas produced in the refining process by the refining apparatus for recycling waste plastics of the present invention. Therefore, the refining apparatus for recycling waste plastics of the present invention can reduce the amount of the additional flammable objects or gases.

Besides, the raw oil obtaining device 101 and/or 102 of the refining apparatus for recycling waste plastics of the present invention further comprises sulfur removing washing tower 151, a wet type washing tower 152 and a waste gas exhausting apparatus 153. Wherein, the waste gas exhausting apparatus 153 is a waste gas exhausting pipe which is connected to the burner 120 of the pyrolysis furnace 115, so that the waste gas produced by the fuel burned by the burner 120 can be exhausted via the waste gas exhausting apparatus 153. The sulfur removing washing tower 151 is assembled in a location of the waste gas exhausting apparatus 153 and sprays lime water to the waste gas exhausting apparatus 153, such that when the waste gas floats through the location where the sulfur removing washing tower 151 sprays lime water, the waste gas reacts with the lime water to remove the sulfur contained in the waste gas. The wet type washing tower 152 is also assembled in a location of the waste gas exhausting apparatus 153 and compared with the sulfur removing washing tower 151, the wet type washing tower 152 can be assembled farther from the burner 120. Wherein, the wet type washing tower 152 can be disposed with two spray holes to spray water to the waste gas exhausting apparatus 153, respectively; wherein when the waste gas contacts to the water sprayed by one of the spray holes, the temperature of the waste gas can therefore be reduced; and when the waste gas contacts to the water sprayed by the other spray hole, the dust in the waste gas is condensed into solid and falls, the impurity of the waste gas can therefore be decreased, so that the waste gas exhausted by the waste gas exhausting apparatus 153 matches up the standard of environmental protection regulations.

Figure 4:
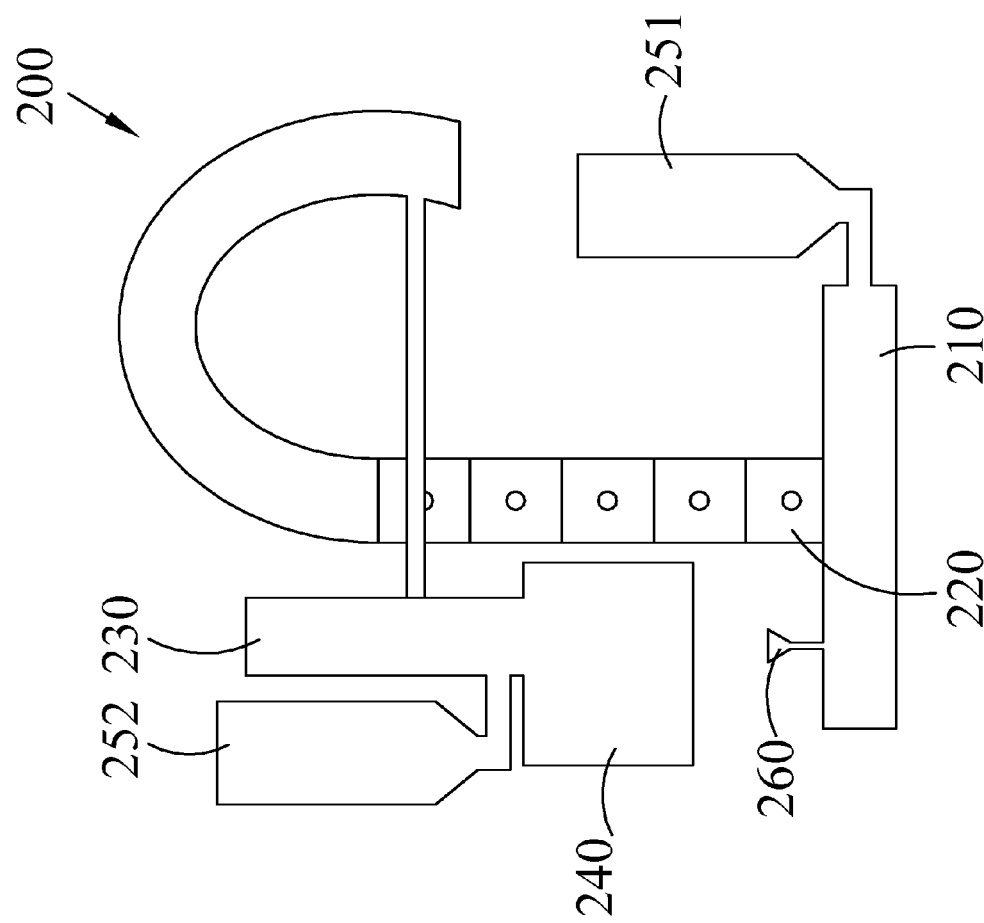
FIG. 4 is a schematic diagram of the second embodiment of a rear end device of a refining apparatus for recycling waste plastics according to the present invention.
Figure 5:
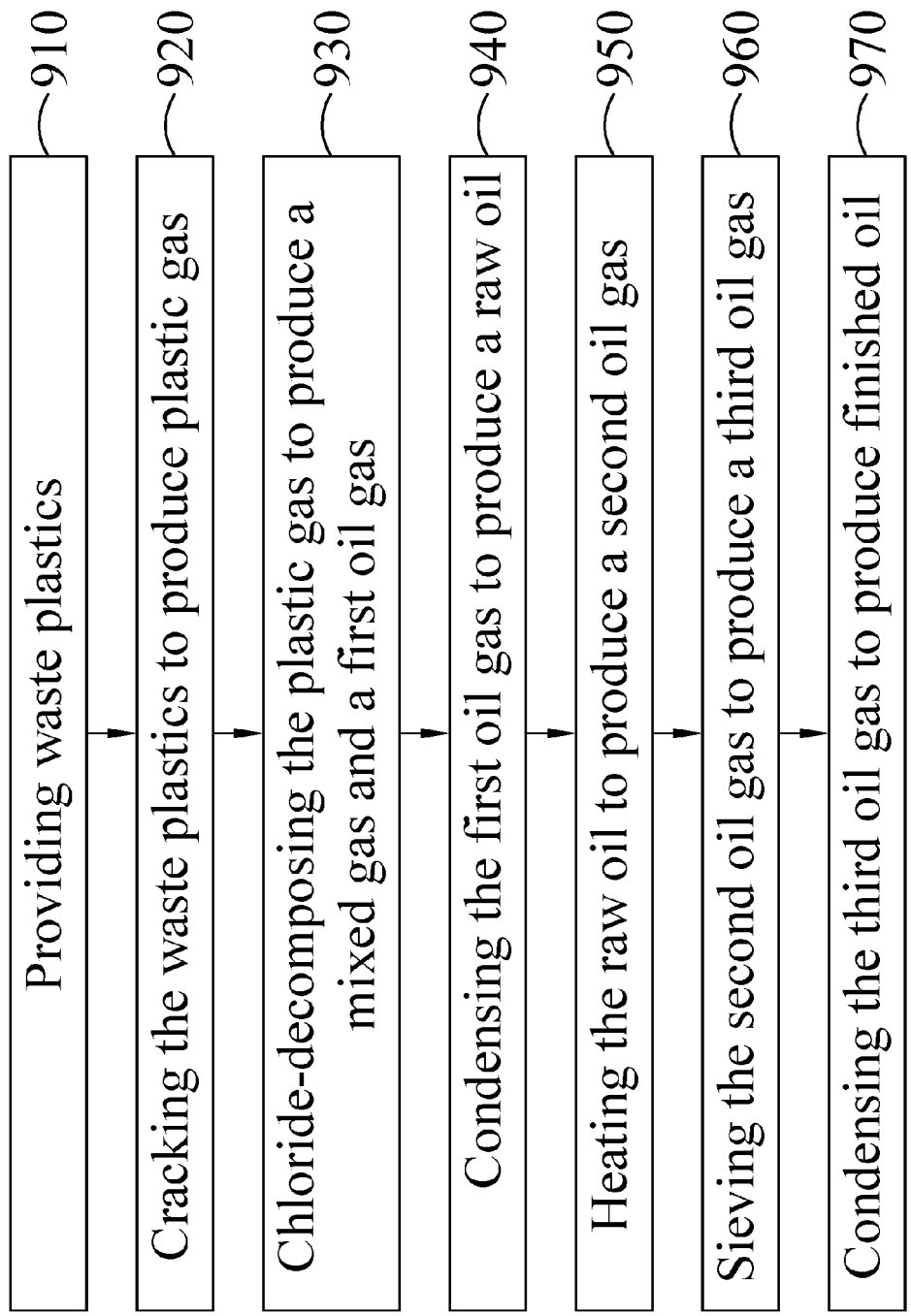
FIG. 5 is a flow chart of a refining method for recycling waste plastics according to the present invention.

Please with reference to FIG. 3 and FIG. 4 altogether, FIG. 4 is a schematic diagram of the second embodiment of a rear end device of a refining apparatus for recycling waste plastics according to the present invention. Wherein, the difference between the rear end device 201 of the first embodiment and the rear end device 200 of the second embodiment depends on that a preheating device 231 and the temporary storage 233 are further included between a second condensation device 232 and the sieve plate tower 220 of the rear end device 201 of the first embodiment, and the second condensation device 232 can be a plate type condenser. The second condensation device 230 of the second embodiment can be a shell and tube condenser, and the rear end device 200 of the second embodiment can further have the vacuum tank 251 and 252.

As FIG. 1 to FIG. 4 show, when the refining apparatus for recycling waste plastics of the present invention obtains the raw oil, the raw oil is introduced in the rear end device 201 and/or 200 to refine a finished oil of high purity. Wherein, the still 210 of the rear end device 201 of the refining apparatus for recycling waste plastics receives the raw oil from the temporary storage 160. For example, the rear end device 201 of the refining apparatus for recycling waste plastics of the present invention further comprises the pipe 261, the preheating device 231 and the pipe 262, wherein the preheating device 231 comprises two pipes designed to exchange heat, wherein one pipe of the two pipes is connected between the pipe 261 and the pipe 262, so that the raw oil from the temporary storage 160 can be carried orderly along the pipe 261, one pipe of the preheating device 231 and the pipe 262 to the still 210 (as shown in FIG. 3). Additionally, an oil inlet 260 is also assembled on the still 210, so that the raw oil flows into the still 210 via the oil inlet 260 (as shown in FIG. 4). Besides, the received raw oil can be warmed up by the still 210 for producing the second oil gas.

Moreover, the sieve plat tower 220 is connected above the still 210 for enabling the second oil gas floating upwardly in the sieve plate tower 220. Wherein, the sieve plate tower 220 has a plurality of sieve plates arranged in a vertical direction orderly, so the second oil gas can be respectively sieved by the sieve plates when floating through the sieve plates orderly. For example, the alignment of the plurality of sieve plates in the sieve plate tower 220 is vertical to the still 210, i.e. is parallel to the floating direction of the second oil gas, such that the second oil gas can floats through each sieve plates, orderly. Wherein, the sieve plates are detachably assembled in the sieve plate tower 220 to benefit the user by taking out or replacing the sieve plates. When the second oil gas floats through each plates orderly, a heavier oil gas of the second oil gas is transformed into the oil via the sieve plates, and the oil is sent back to the still 210 along a channel (not shown); and a lighter oil gas of the second oil gas can therefore float through the sieve plates to produce a third oil gas.

The second condensation device 230 is directly connected to the sieve plate tower 220 or via the pipe to condense the third oil gas to produce finished oil. Additionally, the preheating device 231 and the temporary storage 233 can be assembled between the second condensation device 230 and the sieve plate tower 220, so that the third oil gas can float through the other pipe of the preheating device 231 to the temporary storage 233. Wherein, as the two pipes of the preheating device 231 conducts heat exchange, the heat of the third oil gas is carried to the raw oil to cool down the third oil gas and warm up the raw oil flowing to the still 210. Then, the third oil gas from the temporary storage 233 floats into the second condensation device 232, such that the third oil gas is condensed by the second condensation device 232 so as to produce the finished oil. In addition, the receiving tank 240 is assembled under the second condensation device 232 and receives the finished oil produced by the second condensation device 232. Wherein, the ingredient of the finished oil can be mixed or single liquor with high purity, such as Polyethylene, Polypropylene and/or Polystyrene with high purity.

In addition, the rear end device of the refining apparatus for recycling waste plastics of the present invention further comprises the vacuum tank 251 and/or 252. Wherein, the vacuum tank 251 is assembled at one end of the still 210 to accelerate the raw oil flowing from the temporary storage 160 to the still 210. The vacuum tank 252 is assembled on a top end of the sieve plate tower 220 or a location where is adjacent to the top end to accelerate the second oil gas floating upwardly in the sieve plate tower 220.

As a result, the refining apparatus for recycling waste plastics of the present invention uses the raw oil obtaining device and the rear end device to achieve the purpose of refining the waste plastics as the renewable oil with high purity and reduce the consumption of the fuel resource.

Besides, the present invention further provides a refining method for recycling waste plastics to refine the waste plastics as the renewable oil with high purity. Please with reference to FIG. 5, it is a flow chart of a refining method for recycling waste plastics according to the present invention. As FIG. 1 to FIG. 5 show, the refining method for recycling waste plastics of the present invention provides the waste plastics (step 910). For example, the refining method for recycling waste plastics of the present invention provides the waste plastics into the feeding device 111 and carries the waste plastics from the feeding device 111 to the tundish 113 by the bunker elevator 112, and extrudes the waste plastics from the tundish 113 to the rotary kiln of the pyrolysis furnace 115 by the screw extruder 114. Wherein, the waste plastics can be Polypropylene (PP) plastic, Polyethylene (PE) plastic or Polystyrene (PS) plastic.

And then, the refining method for recycling waste plastics of the present invention cracks the waste plastics to produce the plastic gas (step 920). For example, the refining method for recycling waste plastics of the present invention rotates the rotary kiln of the pyrolysis furnace 115 to rotate the waste plastics therein and provides heat to the waste plastics in the rotary kiln by burning the fuel via the burner 120 to crack the waste plastics and thereby produce the plastic gas. Wherein, the burner 120 is assembled under the rotary kiln. Besides, in the step 920, it can electromagnetically heat the waste plastics inside the pyrolysis furnace 115 and then irradiate with microwave to the heated waste plastics to crack the waste plastics so as to produce the plastic gas by a shorter duration and limited resource. Besides this, the refining method for recycling waste plastics of the present invention further assembles the sulfur removing washing tower 151 and the wet type washing tower 152 on the waste gas exhausting apparatus 153, which exhausts the waste gas produced by the burner 120. Wherein, the sulfur removing washing tower 151 and the wet type washing tower 152 individually sprays lime water and water to the waste gas exhausting apparatus 153 so as to respectively remove the sulfur contained in the waste gas, and reduce the waste gas temperature and remove the dust of the waste gas.

And then, the refining method for recycling waste plastics of the present invention chloride-decomposes the waste gas to produce the mixed gas and the first oil gas (step 930). For example, the refining method for recycling waste plastics of the present invention assembles the chloride-decomposing device 130 having ammonia above the rotary kiln and introduces the plastic gas into the chloride-decomposing device 130 for enabling the plastic gas reacting with the ammonia in the chloride-decomposing device 130 to remove the chlorine of the plastic gas and produce the first oil gas and the mixed gas. Wherein, the mixed gas can be hydrogen, nitrogen and non-condensing gas. The non-condensing gas can be methane, ethane, propane or butane. Then, the refining method for recycling waste plastics of the present invention condenses the first oil gas to produce the raw oil gas by the first condensation device 140 (step 940). For example, the refining method for recycling waste plastics of the present invention carries the first oil gas to the first condensation device 140 by the pipe 181 and condenses the first oil gas to produce the raw oil by the first condensation device 140. The raw oil can be received by the temporary storage 160. Wherein, the mixed gas, which is not condensed to the liquids, can be carried to the burner 120 via the pipe 182 for serving as the fuel. Additionally, the refining method for recycling waste plastics of the present invention further assembles the vacuum device having the vacuum tank 171 and the filtering tank 172 to accelerate the raw oil flowing to the temporary storage 160.

And then, the refining method for recycling waste plastics of the present invention heats the raw oil to produce the second oil gas (step 950). For example, the refining method for recycling waste plastics of the present invention receives the raw oil from the temporary storage 160 by the still 210. The still 210 heats the raw oil therein to produce the second oil gas. Afterward the refining method for recycling waste plastics of the present invention sieves the second oil gas to produce the third oil gas (step 960). For example, the refining method for recycling waste plastics of the present invention introduces the second oil gas into the sieve plate tower 220, which has a plurality of sieve plates arranged in a vertical direction orderly to sieve the second oil gas, respectively. Wherein, the heavier oil gas of the second oil gas is transformed into an oil via the sieve plates and sent back to the still 210; the lighter oil gas of the second oil gas floats through the sieve plates to produce a third oil gas. In addition, the refining method for recycling waste plastics of the present invention can further assemble the vacuum tank 252 on a top end of the sieve plate tower 220 or a location where is adjacent to the top end to accelerate the second oil gas floating upwardly in the sieve plate tower 220.

And then, the refining method for recycling waste plastics of the present invention condenses the third oil gas to produce the finished oil (step 970). For example, the refining method for recycling waste plastics of the present invention directly or via the pipe enables the third oil gas floating into the second condensation device 230, such as a shell and tube condenser, to condense the third oil gas for producing the finished oil by the second condensation device 230. Moreover, the refining method for recycling waste plastics of the present invention assembles the preheating device 231 between the second condensation device 232 and the sieve plate tower 220, such that the third oil gas floats through one pipe of the two pipes of the preheating device 231 while the raw oil carried from the temporary storage 160 to the still 210 also flows through the other pipe of the preheating device 231. Such that the heat between the third oil gas and the raw oil can be exchanged in the preheating device 231 and thereby the third oil gas can be cooled down and the raw oil gas can be warmed up. After cooling down, the third oil gas floats into the second condensation device 232, such as a plate type condenser, to be condensed as the finished oil, then, the finished oil can be received by the receiving tank 240. Wherein, the ingredient of the finished oil can be a mixed or single liquor with high purity, such as Polyethylene, Polypropylene and/or Polystyrene with high purity.

As a result, the refining method for recycling waste plastics of the present invention uses the raw oil obtaining device and the rear end device to achieve the purpose of refining the waste plastics as the renewable oil with high purity and reduce the consumption of the fuel resource.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A refining method for recycling waste plastics, comprising the following steps: providing waste plastics in a feeding device; carrying the waste plastics to a rotary kiln of a pyrolysis furnace, wherein the rotary kiln rotates the waste plastics; providing heat to the waste plastics in the rotary kiln by burning a fuel via a burner, so that the waste plastics being cracked to produce a plastic gas, wherein the burner is assembled under the rotary kiln; introducing the plastic gas into a chloride-decomposing device having ammonia to remove chlorine of the plastic gas and produce a first oil gas and a mixed gas by reacting the waste plastics with the ammonia; condensing the first oil gas to produce a raw oil by a first condensation device; receiving the raw oil by a temporary storage; receiving the raw oil from the temporary storage by a still, wherein the still warms up the raw oil to produce a second oil gas; introducing the second oil gas into a sieve plate tower, wherein the sieve plate tower has a plurality of sieve plates arranged in a vertical direction orderly to sieve the second oil gas, respectively, wherein a heavier oil gas of the second oil gas is transformed into an oil via the sieve plates and sent back to the still, and a lighter oil gas of the second oil gas floats through the sieve plates to produce a third oil gas; condensing the third oil gas to produce a finished oil by a second condensation device; and receiving the finished oil by a receiving tank.

2. The refining method for recycling waste plastics as defined in claim 1, wherein the step of carrying the waste plastics to a rotary kiln of a pyrolysis furnace comprises the following steps:
   carrying the waste plastics from the feeding device to a tundish by a bunker elevator; and
   extruding the waste plastics from the tundish to the rotary kiln by a screw extruder.

3. The refining method for recycling waste plastics as defined in claim 1, wherein the mixed gas is carried to the burner for serving as the fuel by a pipe when the mixed gas is produced.

4. The refining method for recycling waste plastics as defined in claim 1, further comprising the following step:
   using a filtering tank and a vacuum tank to accelerate the raw oil flowing to the temporary storage.

5. The refining method for recycling waste plastics as defined in claim 1, further comprising the following step:
   exchanging heat between the third oil gas and the raw oil by a preheating device to cool down the third oil gas and warm up the raw oil gas carried from the temporary storage to the still when the third oil gas is produced.

* * * * *